US012670435B2

(12) United States Patent
Sun et al.

(10) Patent No.: US 12,670,435 B2
(45) Date of Patent: Jun. 30, 2026

(54) UNLEARNING OF RECOMMENDATION MODELS

(71) Applicant: Lemon Inc., Grand Cayman (KY)

(72) Inventors: Jiankai Sun, Los Angeles, CA (US); Xinlei Xu, Los Angeles, CA (US); Xin Yang, Los Angeles, CA (US); Yuanshun Yao, Los Angeles, CA (US); Chong Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 897 days.

(21) Appl. No.: 17/897,697

(22) Filed: Aug. 29, 2022

(65) Prior Publication Data

US 2024/0070525 A1 Feb. 29, 2024

(51) Int. Cl.
*G06N 20/00* (2019.01)
*G06F 21/62* (2013.01)

(52) U.S. Cl.
CPC ......... *G06N 20/00* (2019.01); *G06F 21/6245* (2013.01)

(58) Field of Classification Search
CPC . G06N 20/00; G06F 21/6245; G06F 16/9535; G06F 18/214; G06F 18/241
See application file for complete search history.

(56) References Cited

U.S. PATENT DOCUMENTS

| | | | | |
|---|---|---|---|---|
| 11,599,750 B2 * | 3/2023 | Gupta Hyde | ....... | G06F 21/6245 |
| 2013/0276022 A1 * | 10/2013 | Tidwell | .............. | G06Q 30/0241 |
| | | | | 725/34 |
| 2017/0227995 A1 * | 8/2017 | Lee | ......................... | G06N 20/00 |
| 2020/0151613 A1 * | 5/2020 | Yoo | ..................... | G06F 11/3466 |

FOREIGN PATENT DOCUMENTS

WO WO-2022216293 A1 * 10/2022 .............. G06N 5/04

OTHER PUBLICATIONS

Viorescu Razvan; "2018 Reform of EU Data Protection Rules"; European Journal of Law and Public Administration; vol. 4 Issue 2; 2017; p. 27-39.
Bennett et al.; "The Netflix Prize"; KDD Cup and Workshop; Aug. 2007; 4 pages.

(Continued)

*Primary Examiner* — Joseph P Hirl
(74) *Attorney, Agent, or Firm* — BakerHostetler

(57) ABSTRACT

The present disclosure describes techniques of performing machine unlearning in a recommendation model. An unlearning process of the recommendation model may be initiated in response to receiving a request for deleting a fraction of user data from any particular user. The recommendation model may be pre-trained to recommend content to users based at least in part on user data. Values of entries in a matrix corresponding to the fraction of user data may be configured as zero. The matrix may comprise entries denoting preferences of users with respect to content items. Confidence values associated with the fraction of user data may be configured as zero to block influence of the fraction of user data on performance of the recommendation model. The unlearning process may be implemented by performing a number of iterations until the recommendation model has converged.

18 Claims, 11 Drawing Sheets

(56) References Cited

OTHER PUBLICATIONS

Blum et al.; "Beating the Hold-Out: Bounds for K-fold and Progressive Cross-Validation"; 12th Annual Conf. on Computational Learning Theory; 1999; p. 203-208.

Bourtoule et al.; "Machine Unlearning"; IEEE Symposium on Security and Privacy; 2021; p. 141-159.

Andrew Burt; "How will the GDPR impact machine learning?"; https://www.oreilly.com/radar/how-will-the-gdpr-impact-machine-learning/; May 2018; O'Reilly; accessed Feb. 3, 2023; 8 pages.

Calandrino et al.; ""You Might Also Like:" Privacy Risks of Collaborative Filtering"; IEEE Symposium on Security and Privacy; 2011; p. 231-246.

Carlini et al.; "The Secret Sharer: Evaluating and Testing Unintended Memorization in Neural Networks"; 28th USENIX Security Symposium; Aug. 2019; p. 267-284.

Chaney et al.; How algorithmic confounding in recommendation systems increases homogeneity and decreases utility; Proceedings of the 12th ACM Conf. on Recommender Systems; Sep. 2018; p. 224-232.

Chen et al.; "Recommendation Unlearning"; Proceedings of the ACM Web Conf.; Apr. 2022; p. 2768-2777.

Chen et al.; "When Machine Unlearning Jeopardizes Privacy"; ACM SIGSAC Conf. on Computer and Communications Security; Nov. 2021; p. 896-911.

Choquette-Choo et al.; "Label-Only Membership Inference Attacks"; 38th Int'l Conf. on Machine Learning; vol. 139; 2021; p. 1964-1974.

Diffie et al.; "Privacy and authentication: An introduction to cryptography"; Proceedings of the IEEE; vol. 67; 1979; p. 397-427.

Drineas et al.; "Fast Approximation of Matrix Coherence and Statistical Leverage"; Journal of Machine Learning Research; vol. 13; 2012; p. 3475-3506.

Dwork et al.; "Differential privacy and robust statistics"; 41st Annual ACM Symposium on Theory of Computing May 2009; 41 pages.

Ginart et al.; "Making AI Forget You: Data Deletion in Machine Learning"; Advances in Neural Information Processing Systems 32; 2019; 14 pages.

Golatkar et al.; "Eternal Sunshine of the Spotless Net: Selective Forgetting in Deep Networks"; IEEE/CVF Conf. on Computer Vision and Pattern Recognition; 2020; p. 9304-9312.

Grau et al.; ""Eternal Sunshine of the Spotless Mind" and the Morality of Memory"; The Journal of Aesthetics and Art Criticism; vol. 64 No. 1; 2006; p. 119-133.

Harper et al.; "The MovieLens Datasets: History and Context"; ACM Transactions on Interactive Intelligent Systems; vol. 5; 2015; 20 pages.

Hu et al.; "Collaborative Filtering for Implicit Feedback Datasets"; 8th IEEE Int'l Conf. on Data Mining; 2008; p. 263-272.

Izzo et al.; "Approximate Data Deletion from Machine Learning Models"; 24th Int'l Conf. on Artificial Intelligence and Statistics; vol. 130; 2021; p. 2008-2016.

Jain et al.; "Low-rank matrix completion using alternating minimization"; 45th Annual ACM Symposium on Theory of Computing; 2013; 40 pages.

Jayaraman et al.; "Revisiting Membership Inference Under Realistic Assumptions"; Cryptography and Security; arXiv:2005.10081; Jan. 2021; 28 pages.

Jiang et al.; "Degenerate Feedback Loops in Recommender Systems"; AAAI/ACM Conf. on AI, Ethics and Society; Mar. 2019; 10 pages.

Kearns, Michael; "A Bound on the Error of Cross Validation Using the Approximation and Estimation Rates, with Consequences for the Training-Test Split"; Advances in Neural Information Processing Systems 8; 1995; p. 183-189.

Koren, Yehuda; "The BellKor Solution to the Netflix Grand Prize"; Netflix Documentation; Aug. 2009; 10 pages.

Koren et al.; "Matrix Factorization Techniques for Recommender Systems"; Computer; vol. 42; Aug. 2009; p. 42-49.

"Title 1.81.5, The California Consumer Privacy Act of 2018, CCPA"; https://www.isipp.com/resources/full-text-of-the-california-consumer-privacy-act-of-2018-copa/; 2018; accessed Feb. 7, 2023; 21 pages.

Li et al.; "Making Recommender Systems Forget: Learning and Unlearning for Erasable Recommendation"; Information Retrieval; arXiv:2203.11491; Mar. 2022; 10 pages.

Liu et al.; "Fast Differentially Private Matrix Factorization"; 9th ACM Conf. on Recommender Systems; 2015; 13 pages.

Long et al.; "A Pragmatic Approach to Membership Inferences on Machine Learning Models"; IEEE European Symposium on Security and Privacy; 2020; p. 521-534.

Mansoury et al.; "Feedback Loop and Bias Amplification in Recommender Systems"; 29th ACM Int'l Conf. on Information & Knowledge Management; Oct. 2020; 5 pages.

Massimi et al.; "A death in the family: opportunities for designing technologies for the bereaved"; SIGCHI Conf. on Human Factors in Computing Systems; Apr. 2010; p. 1821-1830.

McSherry et al.; "Differentially private recommender systems: Building privacy into the Netflix Prize contenders"; ACM SIGKDD Int'l Conf. on Knowledge Discovery and Data Mining; 2009; 9 pages.

Mohri et al.; "Can matrix coherence be efficiently and accurately estimated?"; 14th Int'l Conf. on Artificial intelligence and Statistics; vol. 15; 2011; p. 534-542.

Neel et al.; "Descent-to-Delete: Gradient-Based Methods for Machine Unlearning"; 32nd Int'l Conf. on Algorithmic Learning Theory; vol. 132; 2021; 32 pages.

Papernot et al.; "Semi-supervised Knowledge Transfer for Deep Learning from Private Training Data"; Machine Learning; arXiv:1610.05755; Mar. 2017; 16 pages.

Powles et al.; "How Google Determined Our Right to be Forgotten"; The Guardian; Feb. 2015; https://www.theguardian.com/technology/2015/feb/18/the-right-be-forgotten-google-search#:~text=The%20court%20ruled%20that%20personal,there%20is%20no%20public%20interest.; accessed Feb. 9, 2023; 15 pages.

Rahimian et al.; "Sampling Attacks: Amplification of Membership Inference Attacks by Repeated Queries"; Cryptography and Security; arXiv:2009.00395; Sep. 2020; 14 pages.

Rahman et al.; "Membership Inference Attack against Differentially Private Deep Learning Model"; Transactions on Data Privacy; vol. 11; 2018; p. 61-79.

Recht, Benjamin; "A Simpler Approach to Matrix Completion"; Journal of Machine Learning Research; vol. 12; 2011; p. 3413-3430.

Rosen, Jeffrey; "The Right to be Forgotten"; Stanford Law Review Online; vol. 64; Feb. 2012; 4 pages.

Sekhari et al.; "Remember What You Want to Forget: Algorithms for Machine Unlearning"; Advances in Neural Information Processing Systems 34; 2021; 12 pages.

Sherman et al.; "Adjustment of an Inverse Matrix Corresponding to a Change in One Element of a Given Matrix"; The Annals of Mathematics Statistics; vol. 21; 1950; p. 124-127.

Shokri et al.; "Membership Inference Attacks Against Machine Learning Models"; IEEE Symposium on Security and Privacy; 2017; 16 pages.

Takacs et al.; "Applications of the conjugate gradient method for implicit feedback collaborative filtering"; 5th ACM Conf. on Recommender Systems; 2011; p. 297-300.

Thudi et al.; "On the Necessity of Auditable Algorithmic Definitions for Machine Unlearning"; 31st USENIX Security Symposium; Aug. 2022; p. 4007-4022.

Truex et al.; "Demystifying Membership Inference Attacks in Machine Learning as a Service"; IEEE Transactions on Services Computing; vol. 14; 2019; 17 pages.

S.3195—Consumer Online Privacy Rights Acts; https://www.congress.gov/bill/117th-congress/senate-bill/3195; accessed Feb. 10, 2013; one page.

Uschmajew A.; "Local Convergence of the Alternating Least Squares Algorithm for Canonical Tensor Approximation"; SIAM Journal of Matrix Analysis and Applications; vol. 33; 2012; 25 pages.

Villarogna et al.; "Humans forget, machines remember: Artificial intelligence and the Right to Be Forgotten"; Computer Law & Security Review; vol. 34; Apr. 2018; 20 pages.

(56) References Cited

OTHER PUBLICATIONS

Waldman, Ariza E.; "Cognitive biases, dark patterns, and the 'privacy paradox'"; Current Opinion in Psychology; vol. 31; 2020; p. 105-109.
Ye et al.; "Enhanced Membership Inference Attacks against Machine Learning Models"; Machine Learning; arXiv:2111.09679; Sep. 2022; 19 pages.

\* cited by examiner

Figure 2:
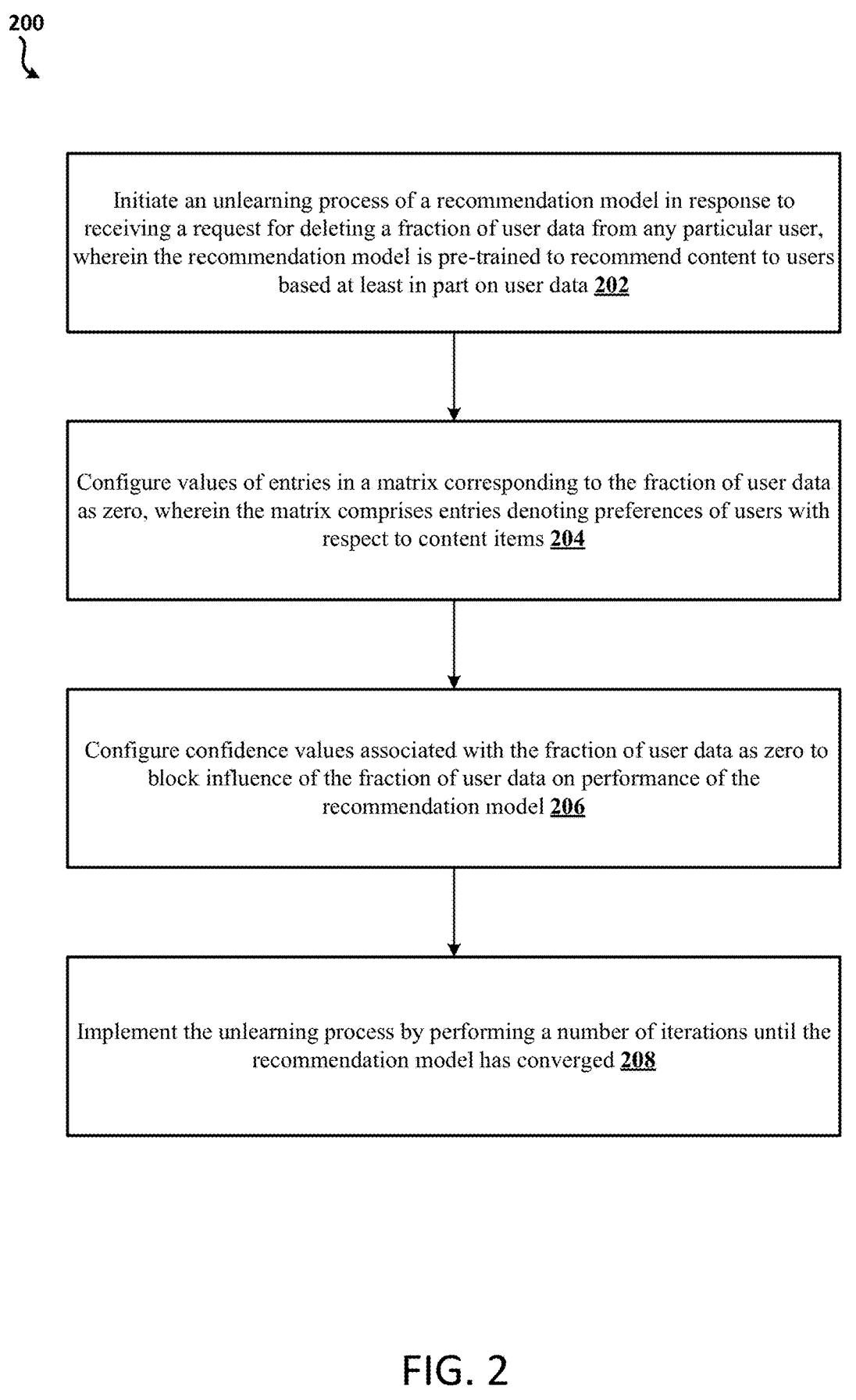

200

Initiate an unlearning process of a recommendation model in response to receiving a request for deleting a fraction of user data from any particular user, wherein the recommendation model is pre-trained to recommend content to users based at least in part on user data 202

Configure values of entries in a matrix corresponding to the fraction of user data as zero, wherein the matrix comprises entries denoting preferences of users with respect to content items 204

Configure confidence values associated with the fraction of user data as zero to block influence of the fraction of user data on performance of the recommendation model 206

Implement the unlearning process by performing a number of iterations until the recommendation model has converged 208

Configure an unlearning process based at least in part on an Alternating Least Squares (ALS) algorithm, wherein the unlearning process enables a recommendation model to perform with approximately the same accuracy and approximately the same privacy as a model that is retrained from scratch based on remaining user data, and wherein the unlearning process is faster than retraining the model from scratch based on the remaining user data 302

Configure values of entries in a matrix corresponding to the fraction of user data as zero, wherein the matrix comprises entries denoting preferences of users with respect to content items 304

Configure confidence values associated with the fraction of user data as zero to block influence of the fraction of user data on performance of the recommendation model 306

Implement the unlearning process by performing a number of iterations until the recommendation model has converged 308

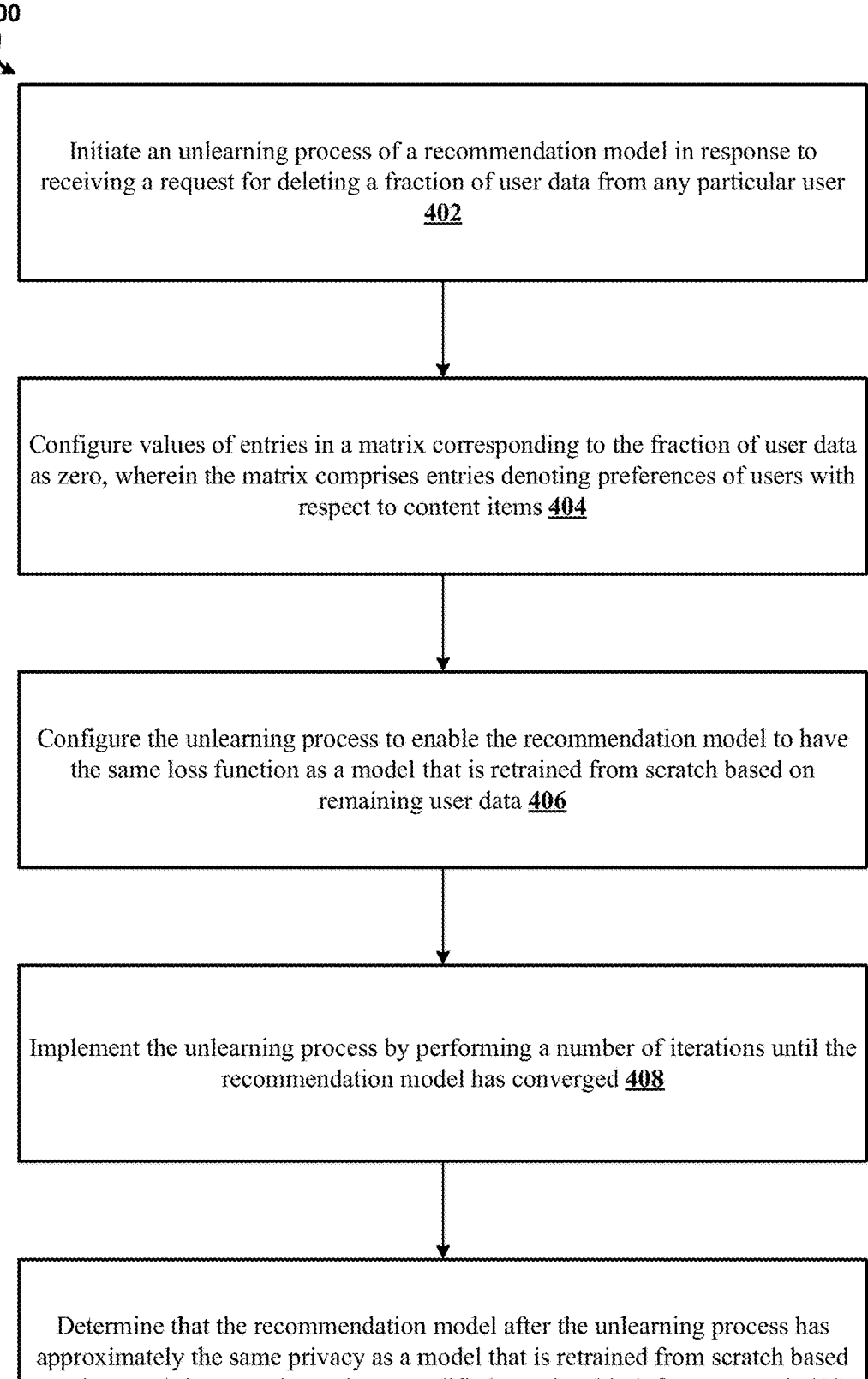

Initiate an unlearning process of a recommendation model in response to receiving a request for deleting a fraction of user data from any particular user 402

Configure values of entries in a matrix corresponding to the fraction of user data as zero, wherein the matrix comprises entries denoting preferences of users with respect to content items 404

Configure the unlearning process to enable the recommendation model to have the same loss function as a model that is retrained from scratch based on remaining user data 406

Implement the unlearning process by performing a number of iterations until the recommendation model has converged 408

Determine that the recommendation model after the unlearning process has approximately the same privacy as a model that is retrained from scratch based on the remaining user data using a modified membership inference attack 410

Initiate an unlearning process of a recommendation model in response to receiving a request for deleting a fraction of user data from any particular user 502

Configure values of entries in a matrix corresponding to the fraction of user data as zero, wherein the matrix comprises entries denoting preferences of users with respect to content items 504

Configure confidence values associated with the fraction of user data as zero to block influence of the fraction of user data on performance of the recommendation model 506

Determine a number of iterations based on a validated best fit to remaining user data 508

Implement the unlearning process by performing the number of iterations until the recommendation model has converged 510

UNLEARNING OF RECOMMENDATION MODELS

BACKGROUND

Machine learning models are increasingly being used across a variety of industries to perform a variety of different tasks. Such tasks may include making predictions or recommendations about data. Improved techniques for utilizing machine learning models are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 shows an example unlearning process for a recommendation model in accordance with the present disclosure.

FIG. 3 shows another example unlearning process for a recommendation model in accordance with the present disclosure.

FIG. 4 shows another example unlearning process for a recommendation model in accordance with the present disclosure.

FIG. 5 shows another example unlearning process for a recommendation model in accordance with the present disclosure.

DETAILED DESCRIPTION OF ILLUSTRATIVE EMBODIMENTS

Figure 1:
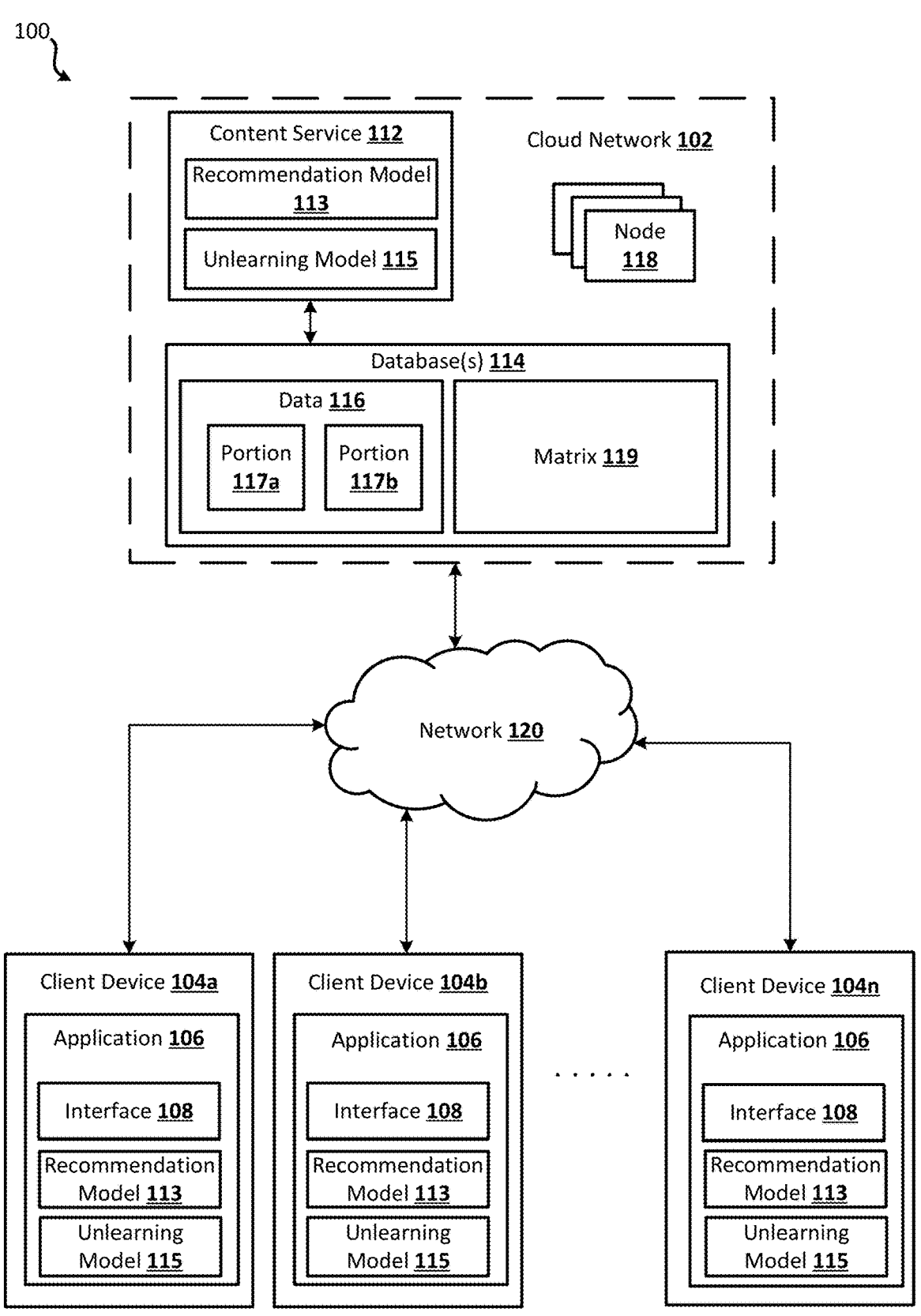
FIG. 1 shows an example system that may be used in accordance with the present disclosure.

Recommendation models may encompass a class of techniques and algorithms which are able to suggest "relevant" items to users. Ideally, the suggested items are as relevant to the user as possible, so that the user will engage with those items. The relevancy is something that the recommendation models must determine. Such determination may be made mainly based on historical data. For example, the recommendation models may be trained on historical data indicating items that the user has engaged with in the past.

However, such recommendation models may make traumatic or stressful live events especially painful. For example, an individual that has streamed romantic comedy movies exclusively with their significant other may break up with their significant other. It may be painful for that individual if a recommendation model continues to recommend that the individual stream romantic comedy movies. As another example, an expecting mom who has been shopping for baby goods may miscarry. It may be painful if her streaming recommendations and/or shopping recommendations continue to be related to baby goods or motherhood even after the miscarriage. To move on from grief, a human user ought to have the ability to remove past records that bring them horror or regret. In such instances, it is desirable that recommendation models stop recommending these unwanted items.

Society places pressure on platforms that train on user data to give users real-time options to remove the influence of deleted data. Despite research progress, however, real world systems have not yet caught on. When users opt to remove their past records' influence on recommendations, existing implementations tend to fall under two categories: complete expunging of their recommendation, in which a user's all historic interactions are zero-ed, or a vague removal of learnt concepts. While many services offer granular control over which ones of their historic actions the platform collects, they do not promise that the deletion necessarily impacts the downstream systems that learn from such data.

Ostensibly, two factors prevent machine unlearning to be deployed. First, legal recognition for the associated privacy risks is lacking, as GDPR-style deletion hinges on whether automated systems leak private data for the general public. For that, the techniques described herein add to the rigor of discovery: empirical evaluation needs revisiting. Second, industrial-scale computation expenditure on pre-trained machine learning models is massive, and there has yet been a compelling demonstration that industrial-scale recommendation models can be efficiently unlearned without hurting the bottom line. For this factor, the techniques described herein propose performing unlearning for recommendation models. The techniques described in the present disclosure enable a recommendation model after an unlearning process (i.e., unlearned model) to perform with approximately the same accuracy and approximately the same privacy as a model that is retrained from scratch based on remaining user data (i.e., retrained model).

Thus, techniques for updating downstream recommendations to reflect the removal of random training data without incurring the high cost of re-training are desirable. Described herein are techniques for performing unlearning in recommendation model(s). The techniques described herein can be applied directly to any trained bi-linear recommendation model (with minimal architecture change) regardless of the training procedure. The unlearning techniques described herein enable a recommendation model without retraining from scratch after data removal (i.e., untrained model) having approximately (substantially) the same accuracy as a retrained model but with faster convergence. In additional to describing techniques for unlearning herein, the privacy implications of the bi-linear model with respect to the Right to Be Forgotten are also described herein.

Described herein is a fast heuristic that unlearns a bi-linear model while making no compromise to recommendation accuracy. Describe herein is a fast empirical removal algorithm whose objective function aligns with re-training from scratch using remaining data exactly. Thus, there is no degradation in model performance caused by choosing unlearning over re-training. The scale problem is addressed with a numerical speedup with Woodbury inverse adjustments, which makes it fast to unlearn a few data points from a large matrix. The unlearning process described herein simulates retraining in terms of accuracy measures, while also being faster than retraining.

FIG. 1 illustrates an example system 100 that may be used in accordance with the present disclosure. The system 100 may comprise a cloud network 102 and a plurality of client devices 104a-n. The cloud network 102 and the plurality of client devices 104a-n may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a content service 112. The content service 112 may comprise a content streaming service, such as an Internet protocol video streaming service. The content service 112 may be configured to distribute content via a variety of transmission techniques. The content service 112 is configured to provide the content, such as video, audio, textual data, a combination thereof, and/or the like. The content may comprise content streams (e.g., video stream, audio stream, information stream), content files (e.g., video file, audio file, text file), and/or other data. The content may be stored in a database 114. For example, the content service 112 may comprise a video streaming service, a video sharing service, a video hosting platform, a content distribution platform, a collaborative gaming platform, and/or the like.

The plurality of computing nodes 118 may process tasks associated with the content service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the content distributed or provided by the content service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

In an embodiment, the content may be output to different client devices 104a-n via the network 120. The content may be streamed to the client devices 104a-n. The plurality of client devices 104a-n may be configured to access the content from the content service 112. In an embodiment, a client device 104a-n may comprise a content application 106. The content application 106 outputs (e.g., display, render, present) the content to a user associated with the client device 104a-n. The content may comprise videos, audio, comments, textual data and/or the like.

The plurality of client devices 104a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104a-n may be associated with one or more users. A single user may use one or more of the plurality of client devices 104a-n to access the cloud network 102. The plurality of client devices 104a-n may travel to a variety of locations and use different networks to access the cloud network 102.

The content service 112 may be configured to receive input from users. The users may be registered as users of the content service 112 and may be users of the content application 106 operating on client devices 104a-n. The user inputs may include user comments, user ratings, or user feedback associated with the content. The user inputs may include connection requests and user input data, such as text data, digital image data, or user content. The connection requests may comprise requests from the client devices 104a-n to connect to the content service 112.

In an embodiment, a user may use the content application 106 on a client device 104a-n to create content and upload the content to the cloud network 102. The client devices 104a-n may access an interface 108 of the content application 106. The interface 108 may comprise an input element. For example, the input element may be configured to allow users to create the content. To create the content, the user may give the content application 106 permission to access an image capture device, such as a camera, or a microphone of the client device 104a-n. After the user has created the content, the user may use the content application 106 to upload the content to the cloud network 102 and/or to save the content locally to the user device 104a-n. When a user uploads the content to the cloud network 102, they may choose whether they want the content to be viewable by all other users of the content application 106 or viewable by only a subset of the users of the content application 106. The content service 112 may store the uploaded content and any metadata associated with the content as content in one or more databases.

In an embodiment, a user may use the content application 106 on a client device 104a-n to provide input on content. The client devices 104a-n may access an interface 108 of the content application 106 that allows users to provide input associated with content. The interface 108 may comprise an input element. For example, the input element may be configured to receive input from a user, such as a rating, a comment, feedback, or "likes" associated with a particular content item. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a rating, comment, or feedback, along with an identifier of the user that is gave the rating, comment, or feedback, and the timing information for the rating, comment, or feedback to the cloud network 102.

The cloud network 102 may comprise at least one database 114. The database(s) 114 may store user data 116. The user data 116 may include rating, comment, or feedback data. For example, the user data 116 may indicate, for each user of the content service 112, ratings that that particular user has given to particular content items. The ratings may indicate how much the user liked or enjoyed that particular content item. As another example, the user data 116 may indicate for each user of the content service 112, comments or feedback that that particular user has given for particular content items.

In an embodiment, the cloud network 102 and/or the client devices 104a-n comprise a recommendation model 113. The recommendation model 113 may be pre-trained to recommend content to users based at least in part on user data. For example, the recommendation model 113 may be configured to generate, for each user of the content service 112, relevant content items to recommend to the user. The relevant content for recommending to a particular user may include, for example, content that the user is likely to consume or enjoy. To generate such content recommendations, the recommendation model 113 may be trained on historical ratings comments, and/or other data. For example, the recommendation model 113 may be trained on all or a subset of user data 116. As described above, the user data 116 may include content ratings associated with each user of the content service. In an example, the recommendation model 113 may generate, for a particular user, content item recommendations that are similar to content items that the user has rated in the past.

As described above, in some instances, it may be desirable to perform unlearning of the recommendation model 113. For example, a particular user may no longer want to have certain content recommended to them. If a user does not want certain content to be recommended to them anymore, the user may request for deleting a fraction of user data 116 corresponding to the user. The fraction of user data 116 that the user requests to delete may be the portion 117a. For example, the portion 117a may include data indicating that the user has rated for one or more content items that are similar to content that the user no longer wants to be recommended. The user data 116 that the user has not requested to be deleted (e.g., the remaining data) may be the portion 117b. For example, the portion 117b may include data indicating that the user has rated for one or more content items that are similar to content that the user still wants to be recommended.

In response to receiving a request for deleting the portion 117a from a particular user, an unlearning process of the recommendation model 113 may be initiated, such as by an unlearning model 115. The content service 112 and/or the client devices 104a-n may comprise the unlearning model 115. It may be assumed that the recommendation model 113 is a base collaborative filtering model based on matrix factorization, learned through a user-item matrix P. The matrix P may be stored as matrix data 119 in database(s) 114. The content service 112 may observe matrix P, where $p_{ij}:=P[i][j]$ denotes the preference (e.g., rating) of user i with respect to item j. If an interaction between user i and item j is not observed, $p_{ij}=0$. Because the matrix of true preferences cannot be fully observed, entries of matrix P are assumed sampled from ground truth matrix M. In matrix factorization, M can be recovered through a low rank multiplication, $M=X \cdot Y^T$, where X depicts user features over all users, and Y is the underlying item factors. It may also be assumed that the downstream content recommendation(s) for each user may be given based on the ranking of items.

The unlearning process may be configured based at least in part on an Alternating Least Squares (ALS) algorithm. The ALS algorithm (e.g., Algorithm 1) may be as follows:

```
Require: P
Ensure: α = 40
    c_ui ← 1+ α p_ui
    while model does not converge do
        for all u do
            x_u ← (Y^T C^u Y + λI)^-1 C^u p(u)
        end for
        for all i do
            y_i ← (X^T C^i X + λI)^-1 C^i p(i)
        end for
    end while.
```

For given matrix P and desirable rank k, the model parameters $\hat{\theta}=\{\hat{X}, \hat{Y}\}$. The loss function may be the regularized matrix completion:

$$L_{ALS}(X, Y) = \sum_{(u,i) \in D_{obs}} c_{ui}\left(p_{ui} - x_u^T y_i\right)^2 + \lambda\left(\sum_u \|x_u\|^2 + \sum_i \|y_i\|^2\right)$$

where $D_{obs}=\{(u, i)\}$ to denote the coordinates of M that contain explicit observations. The recommendation model is trained (and in certain embodiments, re-trained) with ALS. ALS is simple and parallelizable. Despite having little theoretic guarantee, it converges fast empirically, especially for recommendation data. The key insight lies in making a non-convex optimization convex at each of the alternating minimizations. To tackle implicit feedback, a confidence matrix C may be constructed as a soft copy of the ratings, where $c_{ui}:=1+\alpha\ p_{ui}$ for $\alpha \in R+$. For example, if the ratings were high, the confidence may be high. If the ratings are missing, the confidence is low. The better-behaving C is then used throughout the iterations.

Values of entries in the matrix P corresponding to the portion 117a of user data may be deleted. To delete the portion 117a of user data associated with the user, $p_{ui}$ may be configured as 0 for deleted item-user interaction i, u (e.g., interaction between user i and item u). The removal set, $D_{removal}$, may be uniformly sampled from $D_{removal}$ without replacement, and it cannot be known prior to training. Further, the coordinates in $D_{obs}$ are assumed to be independent and identically distributed to ensure that models trained without access to the deleted data are statistically independent from the removal set. Lastly, $|D_{obs}| \gg |D_{removal}|$ to simulate occasional deletion requests.

In embodiments, P represents a preference matrix, which could be binarized values of 1 (like) or 0 (dislike). A confidence score $c_{ui}=f_c(p_{ui})$, where $f_c$ is deterministic. In our experiments, $c_{ui}=1$ if $p_{ui}=1$, and 0 or very small otherwise. It may be assumed that $f_c\ (p_{ui})=1+\alpha\ p_{ui}$ with a suggested $\alpha=40$. Each experiment starts with new seed, including train-test split and ALS initializations, unless otherwise mentioned. Graphs are made with 5 runs. The removal set $D_{removal}$ is assumed to be uniformly sampled from $D_{obs}$ without replacement. The number of ALS passes ("epoch" or "iter") is the only tunable parameter for fitting base models. A 99-1 split of train-test may be assumed, and epochs may be selected based on the best fit validated AUC.

Confidence values associated with the portion 117a of user data may be configured as zero to block influence of the portion 117a of user data on performance of the recommendation model 113. To blocking confidence on the removed data, may be set to zero for any deleted item-user interaction i, u at all subsequent iterations. Optionally, it may be computed with an adjusted inverse formula. Setting $c_{ui}$ to zero for any deleted item-user interaction i, u prevents further influence of the deleted data, thus allowing the recommendation model 113 to refit to the remaining data (e.g., portion 117b) fast. Thus, the formulation of loss does not include knowledge of the deleted data.

The unlearning process may be implemented by performing a number of iterations until the recommendation model has converged. The unlearning process may be configured based at least in part on an unlearning (i.e., untraining) algorithm. The untraining algorithm (e.g., Algorithm 2) may be as follows:

---

Require: $P, X_0, Y_0, C_0, D_{removal}$|
Ensure: $\alpha = 40$
   for all $(u, i) \in D_{removal}$ do
      $p_{ui} \leftarrow 0, c_{ui} \leftarrow 0,$
   end for
   while model does not converge do
      for all u do
         $x_u \leftarrow (Y^T C^u Y + \lambda I)^{-1} C^u p(u)$
      end for
      for all i do
         $y_i \leftarrow (X^T C^i X + \lambda I)^{-1} C^i p(i)$
      end for
   end while.

---

The unlearning process may enable the recommendation model 113 to perform with approximately the same accuracy and approximately the same privacy as a model that is retrained from scratch based on remaining user data 117b. The unlearning process may also be faster than retraining the model from scratch based on the remaining user data 117b.

As the goal is to neither over-delete nor under-delete, the ideal removal of P[m][n] is to train another model with new preference matrix P' where P' [m][n]=0; P' [i][/]=P[i][j] otherwise. The retrained model will thus treat the removed samples as simply missing data, ensuring privacy requirements. Additionally, only cases where $P_{mn} \neq 0$ are of concern so that the deletion is meaningful.

The intuition behind unlearning is similar to that of fine-tuning: the pre-trained recommendation model 113 has learned useful concepts that should be taken advantage of. However, the goal of unlearning is to re-fit the recommendation model 113 adjusting away from the deleted data.

Using the techniques described here, after the unlearning procedure is performed, the removed data resemble data that was never observed in the first place. Membership Inference (MI) is a popular method that measures training data memorization by a model. Typical membership inference uses a collection of samples that are not in the training data, feed them to the model, and take the outputs as the baseline negative training set. The positive training set is the data that the model has seen in the training set. In MI, the trained model's outputs can be exploited to judge whether a data sample was part of the training data. Typically, an MI classifier $\alpha(M)$: (x)→{0, 1} is a binary logistic regressor. An MI training set may be constructed with positive data of actual training samples' outputs, and negative data of removed training samples' outputs. Nonetheless, a robust unlearning does not require an associated low MI accuracy.

The retrained model and the pre-trained recommendation model can be seen as a function of their observed ratings matrix. Let MI (•): $(\theta, D_{removal}, D_{remain})$→[0, 1], which refers to the membership inference accuracy on a particular model given the removal set and the remaining set. Because all of the evaluations fix the datasets between retraining and untraining, MI (untrain) may refer to membership inference accuracy with untraining. Typically, MI is directly used as a vulnerability measure. As compared against re-training from scratch, the additional vulnerability caused by the choosing untraining over retraining is written may be MI (untrain)— MI (retrain). As discussed in more detail below, MI (unlearn)—MI (train)—MI (undeleted) may instead be used under fixed data splits, to denoise the effect of the base undeleted model.

In theory, matrix completion model is robust to random deletions, but there is no guarantee in practice for individual users. Nevertheless, the theoretic results imply that membership attacks against a well-validated model may be especially challenging. This is discussed in more detail below.

With implicit feedback, removal and test data may be selected in the same way. Moreover, in a preference matrix, their corresponding entries are zeroed. A well-validated model is thus, on average, inherently robust to missing data. The exact solution to matrix completion is inherently robust to randomly sampled deletions under mild assumptions on the data, as discussed in more detail below. Model training typically employs regularization, and early techniques stopped at the best fit (Algorithm 1), not to completion. Plus, matrix coherence cannot be judged on real world data as required. Lastly, the decompositions learned using ALS can be non-unique (nor equivalent up to a rotation), so the removal samples may be especially vulnerable, thus requiring manual deletion.

As described above, our unlearning strategy takes advantage of the fast heuristic used in training implicit feedback recommendations and makes slight modifications. First, the recommendation model 113 is pre-trained. The resulting $X_0$, $Y_0$ may be used in Algorithm 1 to initialize ALS. Second, the user preferences may be deleted. For example, $p_{ui}$ may be configured as 0 for deleted item-user interaction i, u (e.g., interaction between user i and item u). Third, the confidence on removed data may be blocked by setting $c_{ui} \leftarrow 0$ for deleted item-user interaction i, u at all subsequent iterations. While the first two steps are typical for fine-tuning, the third step prevents further influence of the deleted data, thus allowing the model to refit to the remaining data fast. Most importantly, the formulation of loss does not include knowledge of the deleted data.

The holy grail of unlearning is to approximate retraining. Under these modifications top $p_{ui}$ and $c_{ui}$ we find the loss function of Algorithm 2 is functionally equivalent to re-training. This derivation is shown below. The extraneous terms relating to removal data are fully zero-ed. Thus, the untrained model (i.e., model with unlearning) can achieve the same loss as retraining without the removal data.

However, two real world issues still exist. First, empirically, the models are trained with early stopping: the number of epochs to train is determined by minimal loss. Second, matrix factorization solutions via ALS are not unique. For empirical privacy, some of the potential solutions may be more private than others. It is therefore crucial that empirical privacy measures be contemplated.

Algorithms 1 and 2 show that, per-iteration, the unlearning process has the same runtime as a pass of ALS, without making any modification. Its convergence analysis is therefore similar to that of ALS itself. Because the loss of the pre-trained model is minimal, it is easy to see that converging using the untraining (i.e., unlearning) process is faster than doing ALS retraining from scratch. In the unlearning process, model accuracy is expected to decrease as it starts off with high accuracy.

By default, every pass of alternating least squares requires inverting a large matrix. Though fast implementations use conjugate gradient (CG) to approximate inverses, a faster alternative for exactly computing the matrix inverse in utilized in the untraining process, where the original inverse is already available. Adjusting for $c_{ui} \leftarrow 0$ is equivalent to changing a single entry in the diagonal matrix $C^u$. This subtraction of a one-entry matrix is the perturbation of concern. The resulting confidence matrix under untraining, $\widetilde{C^u}$ is very close to the original confidence matrix, where $\widetilde{C^u} = C^u - (\text{diag}[0, \ldots, c_{ui}, \ldots 0])$. Consider a special case of Woodbury's inverse where only one element is subtracted, by Sherman and Morrison's subtraction case, for matrix A, there is $(A-uv^T)^{-1}=A^{-1}+A^{-1}u(1-v^T A^{-1}u)^{-1}v^T A^{-1}$. Let $A:=Y^TC^uY+\lambda I$. The adjusted inverse can be represented as:

$$\widetilde{A}^{-1} = \left(Y^TC^uY+\lambda I\right)^{-1} + \frac{c_{ui}}{1-q}y_i\left(Y^TC^uY+\lambda I\right)^{-1}y_i^T\left(Y^TC^uY+\lambda I\right)^{-1}.$$

Without the inverse adjustment, the retraining runtime and the untraining process runtime are both O $(|D_{obs}|k^2 + n^3k)$. With the inverse adjustment, $X_u \leftarrow (Y^TC^uY+\lambda I)^{-1} C^u p$ (u) may be computed for every user to complete one step of ALS. In ALS, the inverse of A is computed in O $(k^3)$, and using CG speeds it up to $O(k^2p)$ where p is the number of CG iterations. Assuming $A^{-1}$ has been computed in the pretraining step, the adjustment can be seen as a perturbation on A, which we project to its inverse. This allows for a runtime of $O(k^2)$ per user or item per iteration, making every untraining pass $O(|D_{obs}|k^2)$.

In summary, the unlearning process described herein may be used to perform machine unlearning in bi-linear recommendations based on matrix completion, which is simultaneously widely deployed in the real world and under-studied in machine unlearning. This method takes advantage of fast heuristic and can unlearn exactly without compromising model degradation. However, empirically, models learned with regularized matrix completion are not unique, thus unlearning and re-training may exhibit small differences in privacy. To find them, empirical attacks of membership inference may be employed, and the vanilla version may be adapted to denoise the impact of data splits. Trends in vulnerability that were previously obscured may successfully be seen. Several trends emerge from the empirical results. First, the unlearning process described herein is fast and powerful, with no degradation in model performance, unlike most unlearning methods. Second, the unlearning process described herein is not the same as re-training, but it closely relates to re-training in most privacy measures, provided that it is trained to the best fit.

FIG. 2 illustrates an example process 200 of performing machine unlearning. For example, the unlearning model 115 may perform the process 200 to perform machine unlearning in a recommendation model. Although depicted as a sequence of operations in FIG. 2, those of ordinary skill in the art will appreciate that various embodiments may add, remove, reorder, or modify the depicted operations.

As described above, in some instances, it may be desirable to perform unlearning of a recommendation model. For example, a particular user may no longer want to have certain content recommended to them. If a user does not want certain content to be recommended to them anymore, the user may request for deleting a fraction of user data corresponding to the user. For example, the fraction of user data may include data indicating that the user has rated or commented on one or more content items that are similar to content that the user no longer wants to be recommended to him/her. At 202, an unlearning process of a recommendation model may be initiated in response to receiving a request for deleting a fraction of user data from any particular user. The recommendation model may be pre-trained to recommend content to users based at least in part on user data.

The recommendation model may, for example, be a base collaborative filtering model based on matrix factorization, learned through a user-item matrix P, where $p_{ij}:=P[i][j]$ denotes the preference (e.g., rating) of user i with respect to item j. If an interaction between user i and item j is not observed, $p_{ij}=0$. Because the matrix of true preferences cannot be fully observed, entries of matrix P are assumed sampled from ground truth matrix M. In matrix factorization, M can be recovered through a low rank multiplication, $M=X \cdot Y^T$, where X depicts user features over all users, and Y is the underlying item factors. It may also be assumed that the downstream content recommendation(s) for each user may be given based on the ranking of items. The unlearning process may be configured based at least in part on Algorithm 1, described above.

Values of entries in the matrix P corresponding to the fraction of user data may be deleted. To delete the fraction of user data associated with the user, $p_{ui}$ may be configured as zero for deleted item-user interaction data i, u (e.g., interaction between user i and item u). At 204, values of entries in a matrix corresponding to the fraction of user data may be configured as zero. The matrix comprises entries denoting preferences of users with respect to content items.

Confidence values associated with the fraction of user data may be configured as zero to block influence of the fraction of user data on performance of the recommendation model. To blocking confidence on the removed data, $c_{ui}$ may be set to zero for any deleted item-user interaction i, u at all subsequent iterations. At 206, confidence values associated with the fraction of user data may be configured as zero to block influence of the fraction of user data on performance of the recommendation model. Setting $c_{ui}$ to zero for any deleted item-user interaction i, u prevents further influence of the deleted data, thus allowing the recommendation model to refit to the remaining data fast. Thus, the formulation of loss does not include knowledge of the deleted data. At 208, the unlearning process may be implemented by performing a number of iterations until the recommendation model has converged.

FIG. 3 illustrates an example process 300. The unlearning model 115 may perform the process 300 to performing machine unlearning in a recommendation model. Although depicted as a sequence of operations in FIG. 3, those of ordinary skill in the art will appreciate that various embodiments may add, remove, reorder, or modify the depicted operations.

As described above, in some instances, it may be desirable to perform unlearning of a recommendation model. For example, a particular user may no longer want to have certain content recommended to them. If a user does not want certain content to be recommended to them anymore, the user may request for deleting a fraction of user data corresponding to the user. For example, the fraction of user data may include data indicating that the user has rated or commented on one or more content items that are similar to content that the user no longer wants to have recommended to them.

At 302, an unlearning process may be configured based at least in part on an Alternating Least Squares (ALS) algorithm. The unlearning process may enable a recommendation model to perform with approximately the same accuracy and approximately the same privacy as a model that is retrained from scratch based on remaining user data (i.e., remaining user data after deleting a fraction of user data). The unlearning process may be faster than retraining the model from scratch based on the remaining user data. The unlearning process may be initiated in response to receiving a request for deleting a fraction of user data from any particular user.

The recommendation model may, for example, be a base collaborative filtering model based on matrix factorization, learned through a user-item matrix P, where $p_{ij}$:=P[i][j] denotes the preference (e.g., rating) of user i with respect to item j. If an interaction between user i and item j is not observed, $p_{ij}$=0. Because the matrix of true preferences cannot be fully observed, entries of matrix P are assumed sampled from ground truth matrix M. In matrix factorization, M can be recovered through a low rank multiplication, $M=X \cdot Y^T$, where X depicts user features over all users, and Y is the underlying item factors. It may also be assumed that the downstream content recommendation(s) for each user may be given based on the ranking of items. The unlearning process may be configured based at least in part on Algorithm 2, described above.

Values of entries in the matrix P corresponding to the fraction of user data may be deleted. To delete the fraction of user data associated with the user, $p_{ui}$ may be configured as zero for deleted item-user interaction i, u (e.g., interaction between user i and item u). At 304, values of entries in a matrix corresponding to the fraction of user data may be configured as zero. The matrix comprises entries denoting preferences of users with respect to content items.

Confidence values associated with the fraction of user data may be configured as zero to block influence of the fraction of user data on performance of the recommendation model. To blocking confidence on the removed data, $c_{ui}$ may be set to zero for any deleted item-user interaction i, u at all subsequent iterations. At 306, confidence values associated with the fraction of user data may be configured as zero to block influence of the fraction of user data on performance of the recommendation model. Setting $c_{ui}$ to zero for any deleted item-user interaction i, u prevents further influence of the deleted data, thus allowing the recommendation model to refit to the remaining data fast. Thus, the formulation of loss does not include knowledge of the deleted data. At 308, the unlearning process may be implemented by performing a number of iterations until the recommendation model has converged.

FIG. 4 illustrates an example process 400. The unlearning model 115 may perform the process 400 to performing machine unlearning in a recommendation model. Although depicted as a sequence of operations in FIG. 4, those of ordinary skill in the art will appreciate that various embodiments may add, remove, reorder, or modify the depicted operations.

As described above, in some instances, it may be desirable to perform unlearning of a recommendation model. For example, a particular user may no longer want to have certain content recommended to them. If a user does not want certain content to be recommended to them anymore, the user may request for deleting a fraction of user data corresponding to the user. For example, the fraction of user data may include data indicating that the user has rated or commented on one or more content items that are similar to content that the user no longer wants to be recommended to him/her. At 402, an unlearning process of a recommendation model may be initiated in response to receiving a request for deleting a fraction of user data from any particular user. The recommendation model may be pre-trained to recommend content to users based at least in part on user data.

The recommendation model may, for example, be a base collaborative filtering model based on matrix factorization, learned through a user-item matrix P, where $p_{ij}$:=P[i][j] denotes the preference (e.g., rating) of user i with respect to item j. If an interaction between user i and item j is not observed, $p_{ij}$=0. Because the matrix of true preferences cannot be fully observed, entries of matrix P are assumed sampled from ground truth matrix M. In matrix factorization, M can be recovered through a low rank multiplication, $M=X \cdot Y^T$, where X depicts user features over all users, and Y is the underlying item factors. It may also be assumed that the downstream content recommendation(s) for each user may be given based on the ranking of items. The unlearning process may be configured based at least in part on Algorithm 2, described above.

Values of entries in the matrix P corresponding to the fraction of user data may be deleted. To delete the fraction of user data associated with the user, $p_{ui}$ may be configured as zero for deleted item-user interaction i, u (e.g., interaction between user i and item u). At 404, values of entries in a matrix corresponding to the fraction of user data may be configured as zero. The matrix comprises entries denoting preferences of users with respect to content items.

Confidence values associated with the fraction of user data may be configured as zero to block influence of the fraction of user data on performance of the recommendation model. To block confidence on the removed data, may be set to zero for any deleted item-user interaction i, u at all subsequent iterations.

At 406, confidence values associated with the fraction of user data may be configured as zero to block influence of the fraction of user data on performance of the recommendation model. Setting $c_{ui}$ to zero for any deleted item-user interaction i, u prevents further influence of the deleted data, thus allowing the recommendation model to refit to the remaining data fast. Thus, the formulation of loss does not include knowledge of the deleted data. Setting $c_{ui}$ to zero for any deleted item-user interaction data between user i and item u may enable the recommendation model after the unlearning process to have the same loss function as a model that is retrained from scratch based on the remaining user data. For example, the loss function of Algorithm 2 may be functionally equivalent to re-training. In ALS, the loss function may be the regularized matrix completion:

$$L_{ALS}(D_{obs}) = \qquad \text{Equation 1}$$

$$\sum_{(u,i) \in D_{obs}} c_{ui} (p_{ui} - x_u^T y_i)^2 + \lambda \left( \sum_u \|x_u\|^2 + \sum_i \|y_i\|^2 \right).$$

For any set of preference matrix P, deterministic function $f_c$, let the removed dataset be $D_{rm}$. As only explicitly observed data points are removed, it is assumed that $D_{rm} \subset D_{obs}$. When we retrain, we substitute $D_{remain} = D_{obs} - D_{rm}$ for $D_{obs}$, and write the loss under retraining as:

$$L_{ALS}(D_{remain}) = \qquad\qquad\qquad \text{Equation 2}$$
$$\sum_{(u,i) \in D_{remain}} c_{ui}(p_{ui} - x_u^T y_i)^2 + \lambda\left(\sum_u \|x_u\|^2 + \sum_i \|y_i\|^2\right).$$

When we untrain using the unlearning process described herein, we set the confidence values manually to 0 for the indices in the removal set. We thus have:

$$L_{untrainALS}(D_{obs}, D_{rm}) = \qquad\qquad \text{Equation 3}$$
$$\sum_{(u,i) \in D_{obs}} f_c^{untrain}(c_{ui})(p_{ui} - x_u^T y_i)^2 + \lambda\left(\sum_u \|x_u\|^2 + \sum_i \|y_i\|^2\right).$$

where $$f_c^{untrain}$$

(·) transforms the confidence score. Using Kronecker delta δ for set membership, we have:

$$f_c^{untrain}(c_{ui}) = \delta_{(u,i) \in (D_{obs}/D_{rm})} c_{ui} = \left(1 - \delta_{(ui) \in D_{rm}}\right) c_{ui} = c_{ui} - \delta_{(u,i) \in D_{rm}} c_{ui}.$$

Assuming the same removal and observations, the two loss quantities on $\{D_{remain}, D_{obs}, D_{removal}\}$ in Equation 2 may represent RETRAIN_LOSS and in Equation 3 may represent UNTRAIN_LOSS. $D_{removal}$ and $D_{rm}$ may be written interchangeably. Our manual zeroing results in:

UNTRAIN_LOSS =

$$\lambda\left(\sum_{u \in D_{obs}} \|x_u\|^2 + \sum_i \|y_i\|^2\right) + \left(\sum_{(u,i) \in D_{obs}/D_{rm}} f_c^{untrain}(c_{ui})(p_{ui} - x_u^T y_i)^2 + \right.$$
$$\sum_{(u,i) \in D_{rm}} f_c^{untrain}(c_{ui})(p_{ui} - x_u^T y_i)^2 =$$
$$\lambda\left(\sum_{u \in D_{obs}} \|x_u\|^2 + \sum_i \|y_i\|^2\right) + \left(\sum_{(u,i) \in D_{remain}} (c_{ui})(p_{ui} - x_u^T y_i)^2 + \right.$$
$$\sum_{(u,i) \in D_{rm}} (0)(p_{ui} - x_u^T y_i)^2 = \lambda\left(\sum_{u \in D_{obs}} \|x_u\|^2 + \sum_i \|y_i\|^2\right) +$$
$$\sum_{(u,i) \in D_{remain}} (c_{ui})(p_{ui} - x_u^T y_i)^2 = \text{RETRAIN\_LOSS}.$$

Thus, the unlearning process described herein is exact rather than approximate. At 408, the unlearning process may be implemented by performing a number of iterations until the recommendation model has converged.

At 410, it may be determined that the recommendation model after the unlearning process has approximately the same privacy as a model that is retrained from scratch based on the remaining user data using a modified membership inference attack. Validation implies robustness to missing data. In implicit feedback datasets, each unobserved (and deleted) user-item interaction is changed to zero. The empirical validation of the model relies on a train-test split that follows the same zeroing convention. As the mechanism for selecting missing feedback is equivalent to selecting a held-out set, any argument for in-domain generalization from appropriate calibration would imply low prediction losses on missing data for both retrained and undeleted models.

Membership inference needs to succeed by discriminating the predictions from removal data and the remaining data. Varying data splits, a well-calibrated model has similar expected losses. Because optimizing AUC is used for both thresholding membership inference model on the removal data and on remaining validation data on the base retrained recommendation model, $P_{retrained}(p_{ui}=1|(u, i)\sim D_{rm})\approx$Pretrained$(p_{ui}=1|(u,i)\sim D_{obs})=AUC_{retrain}$. For each model, the approximation is directly relatable to validation loss.

If the base model is highly accurate (e.g., has high AUC), the nonnegative loss contribution from removal data is further limited. Empirically, most recommendation data achieve high AUC even with large fractions of data removed. As membership inference needs to discriminate two sets of small, non-negative numerical losses of similar means, the task is inherently hard. A well-validated model may imply robustness to deletion of a small fraction of data. Implicit feedback models are unique, where cross-validated performance implies an upper bound on the expected removal data's loss contribution, provided that the deletions are independent. Though this property makes empirical evaluation for individual privacy harder, it does also mean that the work towards validation and calibration applies directly towards model robustness against deletion. Even though model noise is inevitable in real-world setting, this insight greatly reduces the expectation that there is unknown privacy risk that result from deletion, as all training data is already observed (and presumably pre-selectable for validation).

The uniqueness of matrix completion implies robustness to missing data. We assume the row and column spaces have coherences bounded above by some positive µ0. As it is assumed that the observations are indeed low-rank, the recovery of the true matrix is robust to small fractions of random deletions. For preference matrix P of dimension m×n where m<n, it may be assumed that underlying ground truth matrix M records the true preferences. Because the preferences are low rank, there is rank r and a singular value decomposition $M=U\Sigma V^*$. As any preference entry is bounded, the constant value $\mu_1 = mn/r$ may be obtained. In practice $\mu_1 \geq 1e5$ or greater for very sparse datasets.

Assuming a threshold probability is chosen, so that the resulting matrix completion U V* to the problem $$\min u, v \|X\|_{nuclear}$$
$$\text{s.t. } P_{ui} = M_{ui}(u, i) \in D_{obs}$$

is unique and equivalent to M with the given probability when the number of uniformly random observations reaches $\mu_2 mn$ for $\mu_2 \leq 1$. This re hashes the original result without the explicit write out of the bounds on $\mu_2$ that depends on $\{\mu_0$, r, m, n$\}$ and the chosen probability threshold.

Let |·| denote set cardinality and let q be the fraction of missing data upon user-requested deletions, so that $|D_{removal}| = q|D_{obs}|$. Given $\mu_2$, missing data simply subtracts from the number of total observations. When the size of the remaining data, $(1-q)|D_{obs}|$, is above $\mu_2 mn$, the recovery is unique. Thus, the missing data does not change the uniqueness condition, if $q \leq 1 - \mu_2 |D_{obs}|mn$.

For a sufficient number of observations, the matrix completion solutions need to be inherently robust. The retrained and undeleted models may have the same decomposition under the assumptions described herein, meaning that retraining would not alter the resulting recommendation system in terms of recovered entries (i.e., predictions downstream). Their empirical privacy is thus equivalent, meaning the undeleted model is as private as the retrained model. Unfortunately, the bound is often vacuous, as the real-world data is far sparser than what the theoretics posit. For example, $$\mu_2 \propto \mu_1^2$$

while $\mu_1$ is too large. Additionally, the minimization is often performed using heuristic methods such as alternating least squares, where the uniqueness of the solutions is not guaranteed, even if the underlying un-regularized minimization is unique. For practical privacy, the independence assumptions of random independent removal cannot be guaranteed, as many users will likely remove the most embarrassing content from watch history.

For this disclosure's context, the natural measure is whether an observer of model outputs can recover or guess what a user once sought to remove. Divergence-based measures aim to see the downstream difference between untrained and retrained models using a divergence measure $D(P_{retrain}\|P_{retrain})$. At evaluation it is hoped that $\forall(u, i)\in D_{removal}$, $P_{retrain}(p_{ui}=0)=P_{retrain}(p_{ui}=0)$.

However, in collaborative filtering, this objective is under-constrained, as the adversary can observe outputs outside of those in $D_{removal}$ which may be impacted through the removal process. Even if those removed data points remain similar in output, an adversary may still see from the remaining data some anomalies. Instead, suppose an eavesdropper who can observe all data that is observed, except for a particular entry $p_{u_{i_o},i_o}$, we have $\forall(u, i)\in D_{obs}$, $P_{retrain}((u, i)\sim D_{removal})=P_{retrain}((u, i)\sim D_{removal})$.

Thus, membership attack may be used to empirically calibrate both sides, maximizing the probability of attack success for a given model, and then the difference between those optimal success rates may be measured. For an appropriately forgotten model (e.g., complete and not-deleting), the membership attack rate should not increase for the "best guess" for any data removed from the preference matrix. Two benefits ensue: first, the auto-calibration that is suitable for our threat model, when $P_{retrain}(p_{ui}=0)=P_{retrain}(p_{ui}=0)$ is uncalibrated, and second, the usability when we only have two models per data split, instead of relying on sampling from a distribution of models.

The privacy motivation described herein is a pragmatic user scenario. While being private from one's own recommendations is not considered "unauthorized", letting other users guess the original data with high likelihood constitutes as unauthorized after the data source is withdrawn. Even though the legal implements of the right to be forgotten are limited, forgetting past records at user request is a natural form of privacy. While most cases discussed under the right involve public records, the system through which the information is surfaced may be crucial. Though people may prefer personal data removed purely out of emotional reasons, computational systems often treat data with "decontextualized freshness."

When data is forgotten, we expect the system to behave as though the data was not supplied in the first place. On the other hand, to devise an attack, we use membership attack under the model that an observer of the recommendation system should not be able to tell with high probability whether some information was removed. The data owners request random deletion of training data, to which the model owner responds by updating the model. An eavesdropper with access to the model outputs attempts to guess whether a data point has been removed.

FIG. 5 illustrates an example process 500. The unlearning model 115 may perform the process 500 to performing machine unlearning in a recommendation model. Although depicted as a sequence of operations in FIG. 5, those of ordinary skill in the art will appreciate that various embodiments may add, remove, reorder, or modify the depicted operations.

As described above, in some instances, it may be desirable to perform unlearning of a recommendation model. For example, a particular user may no longer want to have certain content recommended to them. If a user does not want certain content to be recommended to them anymore, the user may request for deleting a fraction of user data corresponding to the user. For example, the fraction of user data may include data indicating that the user has rated or commented on one or more content items that are similar to content that the user no longer wants to have recommended to them. At 502, an unlearning process of a recommendation model may be initiated in response to receiving a request for deleting a fraction of user data from any particular user. The user data comprises data indicating content rating by users and/or other data. The recommendation model may be pre-trained to recommend content to users based at least in part on user data.

The recommendation model may, for example, be a base collaborative filtering model based on matrix factorization, learned through a user-item matrix P, where $p_{ij}:=P[i][j]$ denotes the preference (e.g., rating) of user i with respect to item j. If an interaction between user i and item j is not observed, $p_{ij}=0$. Because the matrix of true preferences cannot be fully observed, entries of matrix P are assumed sampled from ground truth matrix M. In matrix factorization, M can be recovered through a low rank multiplication, $M=X\cdot Y^T$, where X depicts user features over all users, and Y is the underlying item factors. It may also be assumed that the downstream content recommendation(s) for each user may be given based on the ranking of items. The unlearning process may be configured based at least in part on Algorithm 2, described above.

Values of entries in the matrix P corresponding to the fraction of user data may be deleted. To delete the fraction of user data associated with the user, $p_{ui}$ may be configured as 0 for deleted item-user interaction i, u (e.g., interaction between user i and item u). At 504, values of entries in a matrix corresponding to the fraction of user data may be configured as zero. The matrix comprises entries denoting preferences of users with respect to content items.

Confidence values associated with the fraction of user data may be configured as zero to block influence of the fraction of user data on performance of the recommendation model. To blocking confidence on the removed data, $c_{ui}$ may be set to zero for any deleted item-user interaction i, u at all subsequent iterations. At 506, confidence values associated with the fraction of user data may be configured as zero to block influence of the fraction of user data on performance of the recommendation model. Setting $c_{ui}$ to zero for any deleted item-user interaction i, u prevents further influence of the deleted data, thus allowing the recommendation model to refit to the remaining data fast. Thus, the formulation of loss does not include knowledge of the deleted data.

At 508, a number of iterations may be determined based on a validated best fit to remaining user data. For example, a number of iterations required for the recommendation model to converge may be determined. The numbers of iterations for the base models may be chosen for validated best model fit, as to be expected for practical deployments. The 50-50 split for test-train may be used on the removal and remaining datasets for each appropriate removal fraction, meaning that 50% of the removal data is used in training while the rest is used to validate. The best AUC is taken on the removal data for reporting each model's membership attack accuracy. In embodiments, the number of iterations may be equal to or greater than 10 and equal to or less than 45. Even with large removal fractions the base model can still perform well. The less the remaining data, generally the earlier the convergence. 10 passes are sufficient only if removal fraction is large (>70%). For small fractions of removal, the best fit tends to be between [40, 70] passes. In comparison, the untraining (i.e., unlearning) process described herein only takes [10, 45] iterations. At 510, the unlearning process may be implemented by performing the number of iterations until the recommendation model has converged.

As described above, in addition to describing techniques for unlearning herein, the privacy implications of the bilinear model with respect to the Right to Be Forgotten are also described herein. Typical evaluation metrics, including vanilla membership inference classifications, are poorly suited for evaluating privacy from removal data. Identifying model noise as a cause, the vulnerability metric may be re-defined to denoise the effect of data splits, which can show minute privacy risks. The refined metric is only sensitive to a range of deletion, which indicates that binary membership inference accuracies are not sufficient for evaluating the privacy of unlearning.

To investigate the practical implication of using the unlearning process described herein, experiments were conducted to determine the performance of the unlearning process in terms of accuracy, to prevent model degradation, to determine the runtime of unlearning (e.g., whether the unlearning process has fewer iterations than retraining, and to determine if the unlearning process reduces the privacy implications from the undeleted model). For these experiments, a dataset (e.g., MovieLens) was used. For membership inference, the sensitivity issue is severe on larger models, therefore we illustrate with smaller datasets. Unless otherwise specified, parallel implementations for Alternating Least Squares, with conjugate gradient speedup are used, but without our inverse adjustments. Therefore, the number of iterations between untraining and retraining can be compared. The removal dataset is held out as a fraction of total observations. All datasets have a test-train split before data removal, so the heldout set is sampled first. The removal fraction (%) refers to the fraction of explicitly observed entries. For training and evaluating recommendation models themselves, area-under-curve (AUC) is used, which is more accepted than downstream recommendations for a specific configuration. Training and untraining across iterations around convergence are discussed below. The evaluation of random removal fractions at every 5% are discussed below.

There are two baselines for the unlearning process described herein. The first baseline is the undeleted model, which is trained to completion and used to initialize unlearning. It also represents the upper-bound of model performance. The other baseline is re-training from scratch without the removal data, which represents the upper bound of privacy and vulnerability. For model performance, area under curve is used. For membership attacks, vulnerability measures derived from membership inference accuracies are used.

Figure 6:
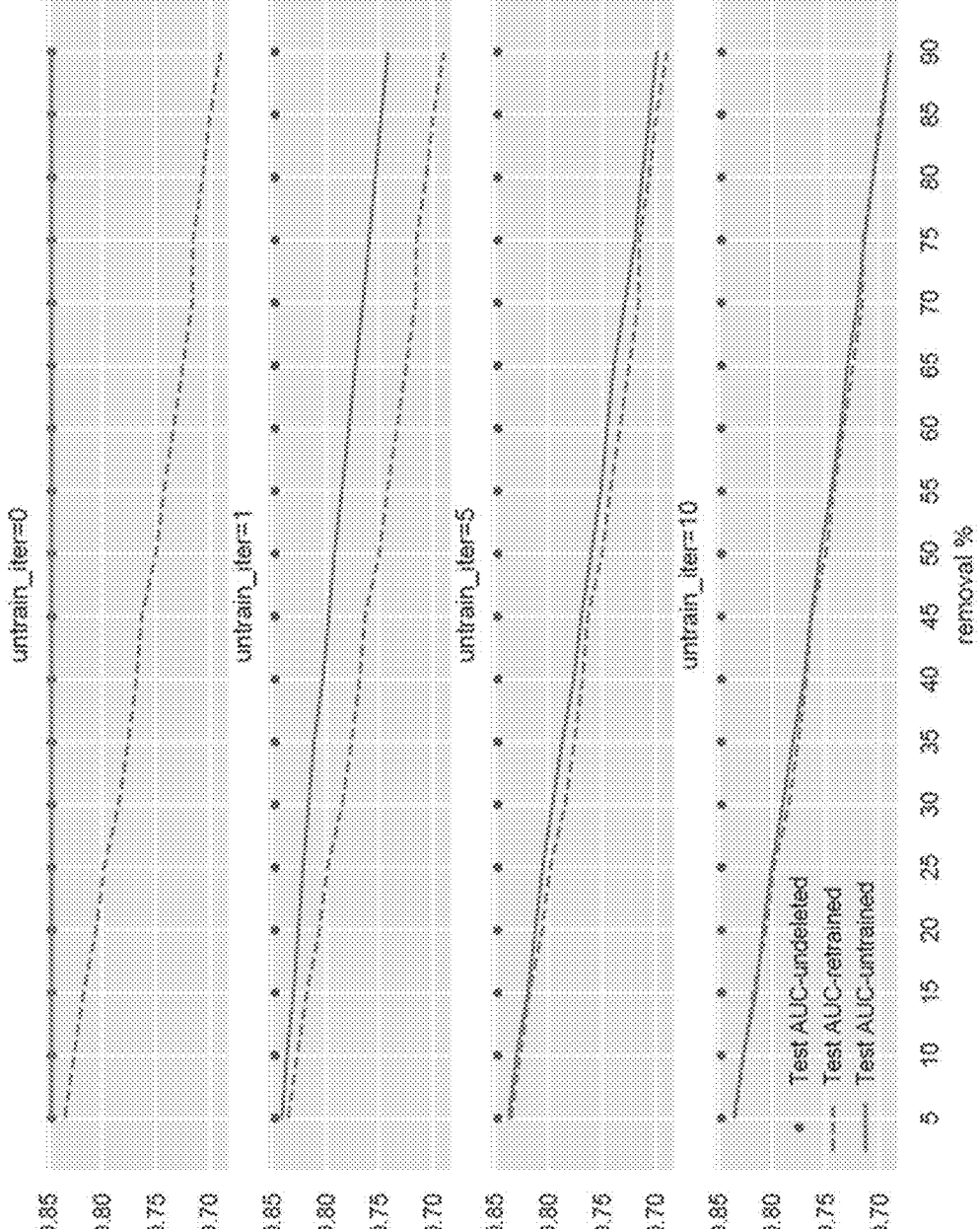
FIG. 6 shows a graph illustrating the area-under-curve for a retrained model and a model with unlearning process in accordance with the present disclosure.

The unlearning process described herein leads to no degradation and has fast convergence compared to retraining a model from scratch. FIG. 6 shows a graph 600 illustrating the area-under-curve (AUC) for a recommendation model without data deletion (i.e., model-undeleted), a model retrained from scratch using remaining user data (i.e., model-retrained), and the recommendation model after an unlearning process (i.e., model-untrained/model-unlearned). The graph 600 shows, across different iterations of unlearning and different removal fractions, each final model's area-under-curve on the test dataset. The AUC of model-retrained in in graph 600 is the AUC by retraining with 25 passes of ALS. As shown in the graph 600, over a wide range of removal fractions, the unlearning process described herein is faster than retraining a model. The graph 600 shows that the AUC of the model-untrained/model-unlearned with 10 iterations is approximately the same as the AUC for retraining with 25 passes of ALS. Thus, the unlearning process described herein is faster (10 iterations vs. 25 iterations) while having approximately the same accuracy as retraining with 25 passes of ALS.

Figure 7:
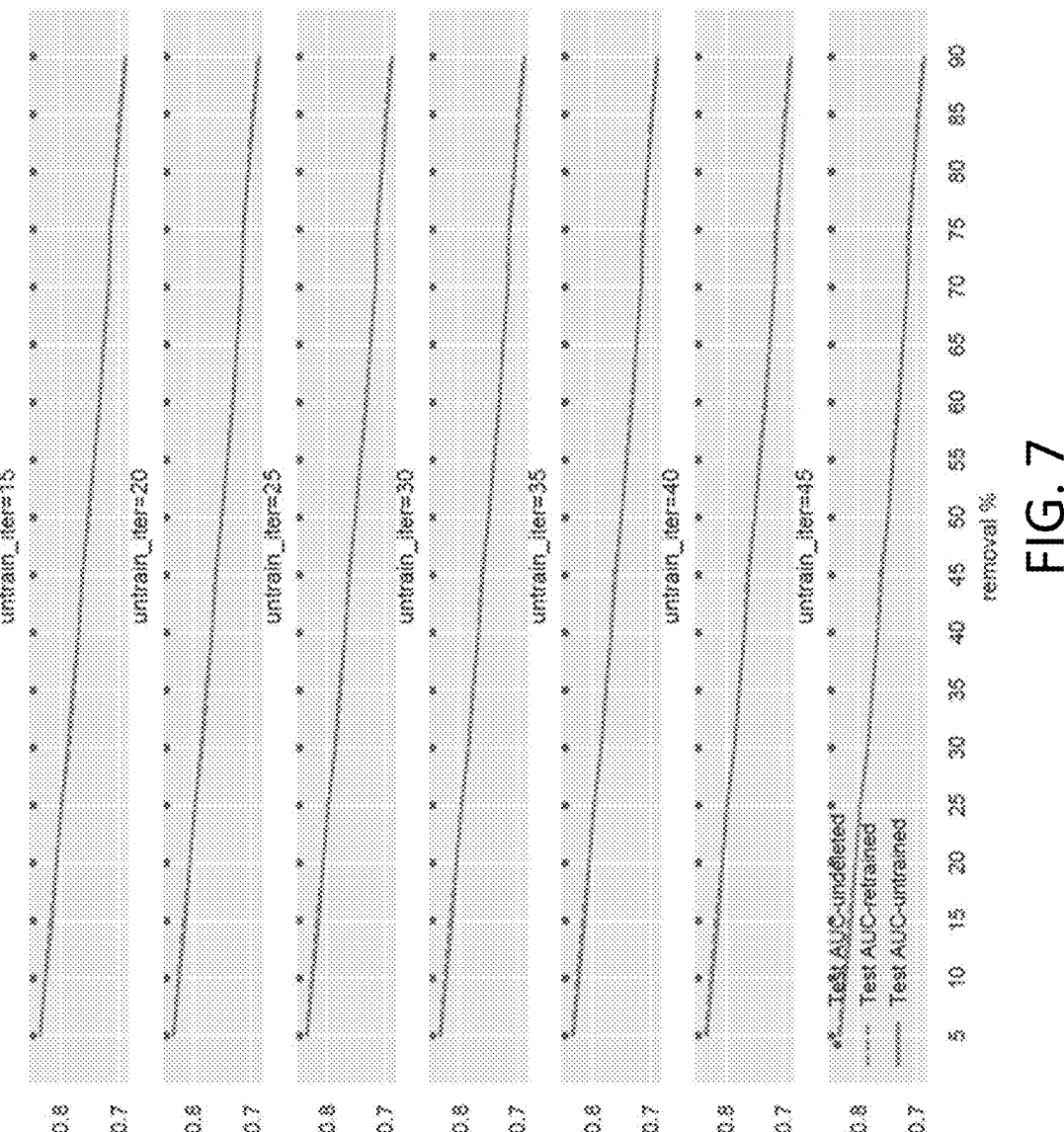
FIG. 7 shows a graph illustrating the area-under-curve for a retrained model and a model with unlearning process in accordance with the present disclosure.

As shown in the graph 700 of FIG. 7, there is no performance degradation with respect to the untraining (i.e., unlearning) process compared against retraining from scratch. Even when unlearning is performed with a high number of iterations, the unlearned model still has approximately the same accuracy as the retrained model. The unlearning process described herein breaks the usual expectation that fast unlearning necessarily degrades the model.

In embodiments, there may be sensitivity issues with membership inference. Empirical attacks based on membership inference against the unlearned model were investigated. Matrix completion-based models do not have a lot of privacy risks to begin with. In implicit feedback datasets, the risks against random data deletion can be mitigated through extensive model validation. As we start with pre-trained recommendation model, it is reasonable to assume that the initial model (i.e., the base model) performs well on a test set. Consider that uniformly removing data is akin to sampling another held-out set, the base model likely predicts the missing items as well. To make matters worse, ALS performs well even after a large portion of data is deleted. Untraining does not observe significant difference between the training data and the removed data, so there is no significant membership inference performance drop. This means the measurement is highly susceptible to small noise. Depending on data splits, the base model (the "undeleted" model) has different membership attack vulnerabilities built-in. This is due to ALS not having a fixed unique solution, so the models from different training trajectories will find different decompositions as solutions to the same matrix completion problem. Some of those models are inherently more defensible than others. This adds noise to the already small numerical measurement.

In the present disclosure, a model retrained from scratch using remaining data is viewed as ground truth with respect to privacy measures. To study the vulnerability of unlearning is to study the additional vulnerability compared with a retrained model. Let IV denote the intrinsic vulnerability associated with the learning strategy. It may be determined whether the unlearning process described herein presents more or less intrinsic risk compared with retraining. Assuming that the training and un-training (i.e., unlearning) procedures have similar intrinsic vulnerability, $IV_{ALS} \approx IV_{retrain}$.

An estimator for $IV_{Untrain-ALS}$ is thus the difference between the empirical measure for membership inference (MI): $IV_{Untrain-ALS}$=MI (untrain)–MI (retrain). Because retraining is assumed to be statistically independent from removed data, being able to infer properties of the removed data from the re-trained model, such as due to data duplication, is not an essential vulnerability. If an empirical measurement shows that untrained/unlearned model has membership vulnerability, it is a tolerable amount of privacy risk under the setup described herein.

However, this measurement on intrinsic untraining vulnerability shows that, at the best fit, untraining and retraining are extremely close. This numerical difference is so small, that the measurement appears dominated by noise, while having inconclusive results. When averaged across runs, the overlap of untraining and retraining are further obscured.

It may be determined that the recommendation model after the unlearning process has approximately the same privacy as a model that is retrained from scratch based on the remaining user data using a membership inference attack. Identifying model noise as a cause, IV' is the modified intrinsic vulnerability measure, applied not only to the same $\{M, D_{obs}, D_{rm}\}$, but also under an identical train-test split. The splits greatly impact the model, as the intrinsic vulnerability to deletion is closely related to model AUC. Using ALS and the untraining process described herein to retrain and unlearn after data removal, three accuracy measurements may be made: MI (untrain), MI (retrain), and MI (undeleted). Even though our privacy model does not directly concern the base model, MI (undeleted) serves to denoise the influence of model splits on our numerical accuracy differences. We have $IV'_{Untrain-ALS}$=MI (untrain)–MI (retrain)–MI (undeleted).

Figure 8:
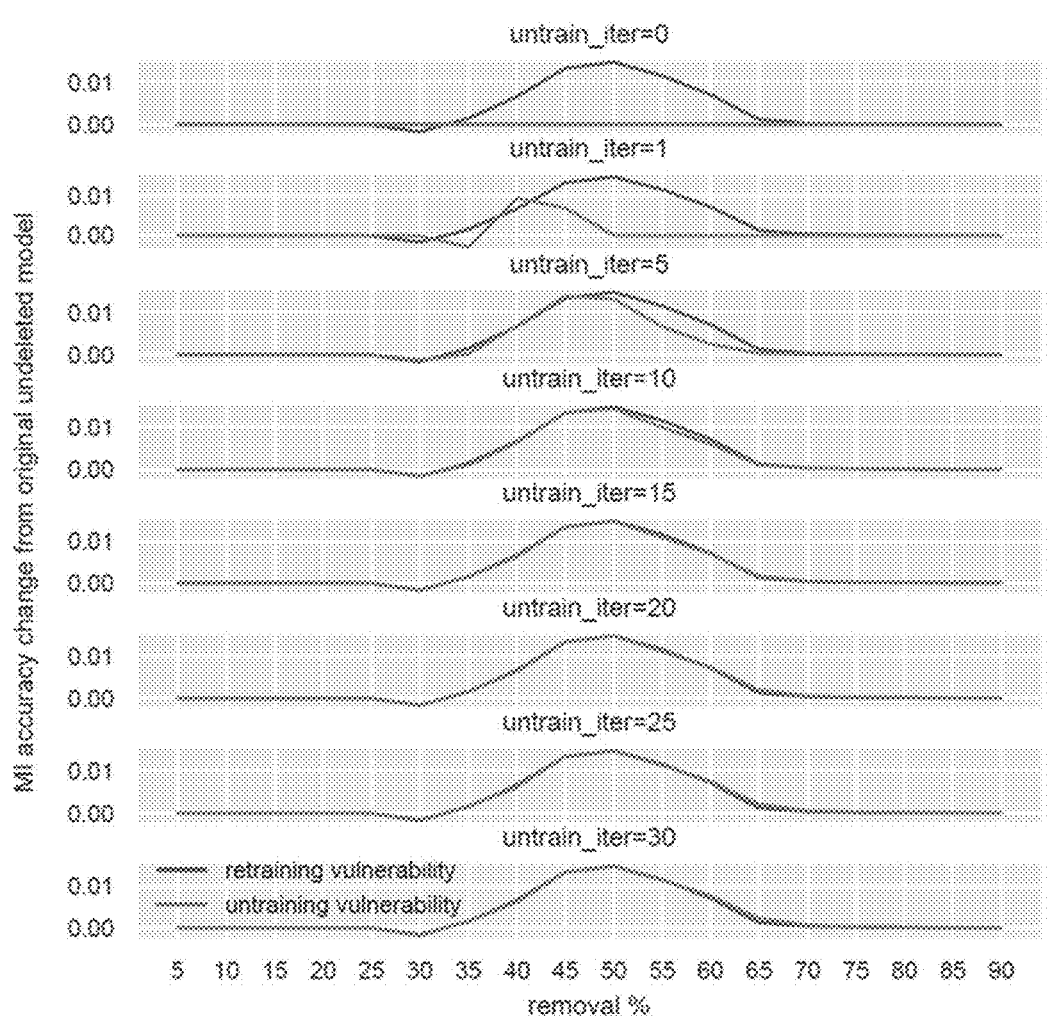
FIG. 8 shows a graph illustrating vulnerability due to data removal for different unlearning iterations and removal fractions compared against 25 passes of retraining in accordance with the present disclosure.
Figure 9:
FIG. 9 shows a graph illustrating vulnerability due to data removal for different retraining iterations and removal fractions compared against 10 passes of unlearning in accordance with the present disclosure.
Figure 10:
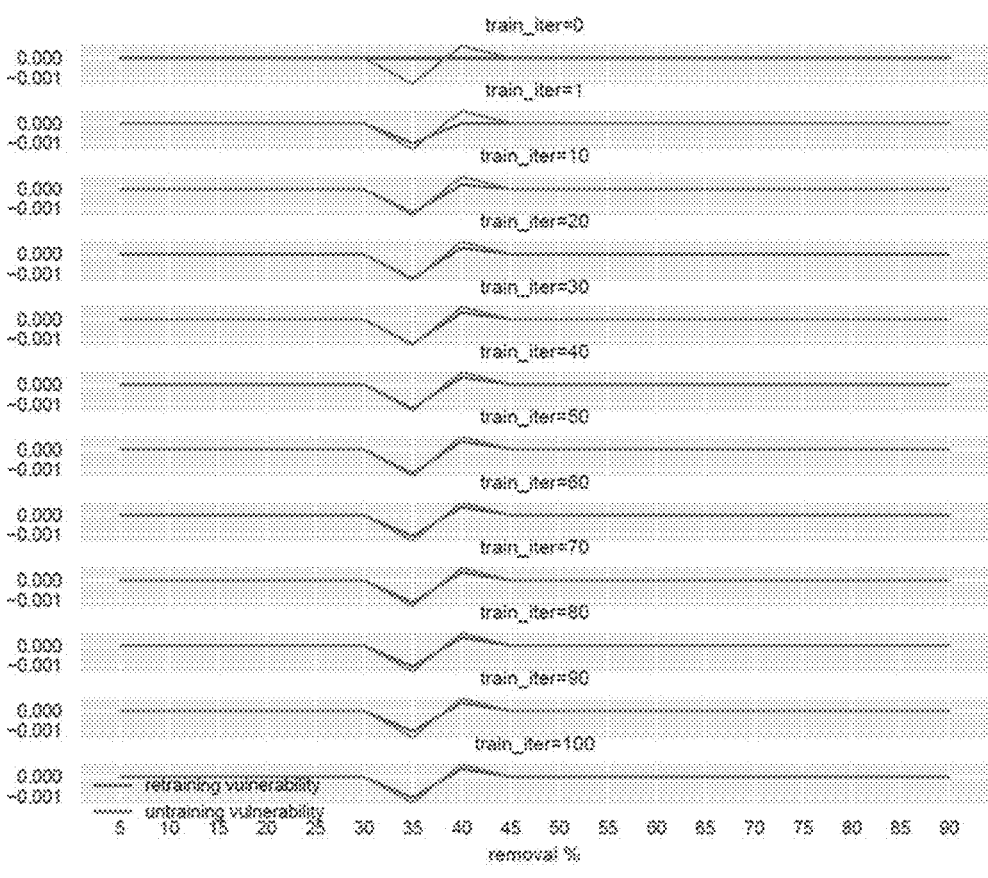
FIG. 10 shows a graph illustrating vulnerability due to data removal for different retraining iterations and removal fractions compared against 45 passes of unlearning in accordance with the present disclosure.

For the same model, $IV'_{Untrain-ALS}$=MI (untrain)–MI (retrain)–MI(undeleted) appears off by a constant from $IV_{untrain-ALS}$=MI (untrain)–MI (retrain), discussed above. However, as a measurement, the subtraction for each run improves numerical stability, and reduces noise when averaged over multiple runs. FIG. 8 shows a graph 800 illustrating vulnerability IV' due to data removal for different untraining iterations and removal fractions compared against 25 passes of retraining. FIG. 9 shows a graph 900 illustrating vulnerability IV' due to data removal for different retraining iterations and removal fractions compared against 10 passes of untraining. FIG. 10 shows a graph 1000 illustrating large scale vulnerability IV' due to data removal for different retraining iterations and removal fractions compared against 45 passes of untraining.

As shown in FIG. 8 and FIG. 9, the vulnerability is measured as membership inference accuracy subtracting membership inference accuracy associated with the undeleted model, for the same split under the test dataset. The removal fraction is set at every 5% of the data, even though we are empirically only concerned with small fractions. The procedures for untraining involves training the base model with the selected number of iterations.

Unlearning and re-training may exhibit small differences in privacy. To find them, empirical attacks of membership inference may be employed, and the vanilla version may be adapted to denoise the impact of data splits. Trends in vulnerability that were previously obscured may successfully be seen. FIG. 8 and FIG. 9 show the trends in vulnerability that were previously obscured. Nonetheless, the efforts to denoise only have a clear effect on small scale on a specific removal range. The range related to user-requested deletion is still not very sensitive.

Figure 11:
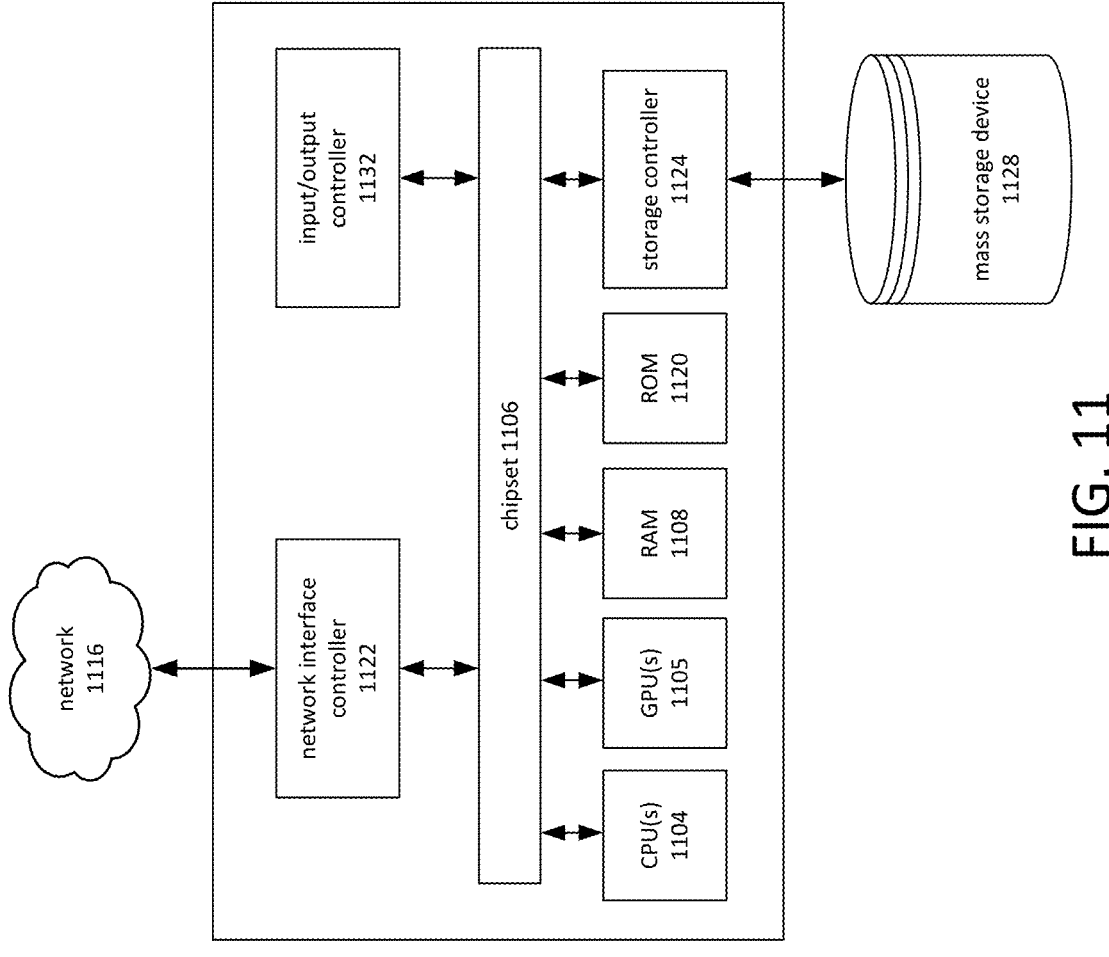
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of performing machine unlearning in a recommendation model, the method implemented by a computer, and the method comprising:

initiating a process of unlearning associated with the recommendation model in response to receiving a request for deleting a fraction of user data associated with a user, wherein the recommendation model is a pre-trained machine learning model that recommends content to users based at least in part on user data, wherein initiating the process of unlearning associated with the recommendation model comprises:

configuring values of entries in a matrix corresponding to the fraction of the user data as zero to delete the fraction of the user data, wherein the matrix comprises entries denoting preferences of users with respect to content items; and configuring confidence values associated with the deleted fraction of the user data as zero; and implementing the process of unlearning after deleting the fraction of the user data and configuring the confidence values associated with the deleted fraction of the user data as zero, wherein the process of unlearning comprises performing a number of iterations to re-fit parameters of the recommendation model to a remainder of the user data using an algorithm without retraining the recommendation model from scratch on the remainder of the user data, wherein configuring the confidence values associated with the deleted fraction of the user data as zero blocks influence of the deleted fraction of the user data on the algorithm during the iterative re-fitting process.

2. The method of claim 1, wherein the unlearning process enables the recommendation model to perform with the same privacy as a retrained recommendation model.

3. The method of claim 1, wherein the algorithm comprises an Alternating Least Squares (ALS) algorithm.

4. The method of claim 1, wherein the recommendation model is a bi-linear model.

5. The method of claim 1, further comprising:

configuring the unlearning process to enable the recommendation model to have the same loss function as a retrained recommendation model.

6. The method of claim 1, further comprising:

determining that the recommendation model after the process of unlearning has approximately the same privacy as a retrained recommendation model using a membership inference attack.

7. The method of claim 1, further comprising:

determining the number of iterations based on an amount of the deleted fraction of the user data, wherein the number of iterations is inversely proportional to the amount of the deleted fraction of the user data.

8. The method of claim 1, wherein the number of iterations is equal to or greater than 10 and equal to or less than 45.

9. A system, comprising:

at least one processor; and at least one memory comprising computer-readable instructions that upon execution by the at least one processor cause the computing device to perform operations comprising:

initiating a process of unlearning associated with the recommendation model in response to receiving a request for deleting a fraction of user data associated with a user, wherein the recommendation model is a pre-trained machine learning model that recommends content to users based at least in part on user data, wherein initiating the process of unlearning associated with the recommendation model comprises:

configuring values of entries in a matrix corresponding to the fraction of the user data as zero to delete the fraction of the user data, wherein the matrix comprises entries denoting preferences of users with respect to content items; and configuring confidence values associated with the deleted fraction of the user data as zero; and implementing the process of unlearning after deleting the fraction of the user data and configuring the confidence values associated with the deleted fraction of the user data as zero, wherein the process of unlearning comprises performing a number of iterations to re-fit parameters of the recommendation model to a remainder of the user data using an algorithm without retraining the recommendation model from scratch on the remainder of the user data, wherein configuring the confidence values associated with the deleted fraction of the user data as zero blocks influence of the deleted fraction of the user data on the algorithm during the iterative re-fitting process.

10. The system of claim 9, wherein the unlearning process enables the recommendation model to perform with the same privacy as a retrained recommendation model.

11. The system of claim 9, wherein the algorithm comprises an Alternating Least Squares (ALS) algorithm.

12. The system of claim 9, the operations further comprising:

configuring the unlearning process to enable the recommendation model to have the same loss function as a retrained recommendation model.

13. A non-transitory computer-readable storage medium, storing computer-readable instructions that upon execution by a processor cause the processor to implement operations, the operation comprising:

initiating a process of unlearning associated with the recommendation model in response to receiving a request for deleting a fraction of user data associated with a user, wherein the recommendation model is a pre-trained machine learning model that recommends content to users based at least in part on user data, wherein initiating the process of unlearning associated with the recommendation model comprises:

configuring values of entries in a matrix corresponding to the fraction of the user data as zero to delete the fraction of the user data, wherein the matrix comprises entries denoting preferences of users with respect to content items; and configuring confidence values associated with the deleted fraction of the user data as zero; and implementing the process of unlearning after deleting the fraction of the user data and configuring the confidence values associated with the deleted fraction of the user data as zero, wherein the process of unlearning comprises performing a number of iterations to re-fit parameters of the recommendation model to a remainder of the user data using an algorithm without retraining the recommendation model from scratch on the remainder of the user data, wherein configuring the confidence values associated with the deleted fraction of the user data as zero blocks influence of the deleted fraction of the user data on the algorithm during the iterative re-fitting process.

14. The non-transitory computer-readable storage medium of claim 13, wherein the unlearning process enables the recommendation model to perform with the same privacy as a retrained recommendation model.

15. The non-transitory computer-readable storage medium of claim 13, wherein the algorithm comprises an Alternating Least Squares (ALS) algorithm.

16. The non-transitory computer-readable storage medium of claim 13, the operations further comprising:

configuring the unlearning process to enable the recommendation model to have the same loss function as a retrained recommendation model.

17. The non-transitory computer-readable storage medium of claim 13, the operations further comprising:

determining the number of iterations based on an amount of the deleted fraction of the user data, wherein the number of iterations is inversely proportional to the amount of the deleted fraction of the user data.

18. The non-transitory computer-readable storage medium of claim 13, wherein the number of iterations is equal to or greater than 10 and equal to or less than 45.

* * * * *